(12) United States Patent
Miyama et al.

(10) Patent No.: US 12,272,993 B2
(45) Date of Patent: Apr. 8, 2025

(54) ROTATING ELECTRIC MACHINE

(71) Applicant: Mitsubishi Electric Corporation, Tokyo (JP)

(72) Inventors: Yoshihiro Miyama, Tokyo (JP); Kosho Yamane, Tokyo (JP); Junji Kitao, Tokyo (JP); Kodai Okazaki, Tokyo (JP); Tatsuo Nishimura, Tokyo (JP); Tomohira Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 294 days.

(21) Appl. No.: 17/912,064

(22) PCT Filed: Jan. 27, 2021

(86) PCT No.: PCT/JP2021/002729
§ 371 (c)(1),
(2) Date: Sep. 16, 2022

(87) PCT Pub. No.: WO2021/205713
PCT Pub. Date: Oct. 14, 2021

(65) Prior Publication Data
US 2023/0111062 A1    Apr. 13, 2023

(30) Foreign Application Priority Data

Apr. 7, 2020 (JP) ................................. 2020-068813

(51) Int. Cl.
*H02K 1/274* (2022.01)
(52) U.S. Cl.
CPC .................................. *H02K 1/274* (2013.01)

(58) Field of Classification Search
CPC .... H02K 2201/03; H02K 1/274; H02K 1/276; H02K 1/2753; H02K 1/2766; H02K 2213/03
(Continued)

(56) References Cited

U.S. PATENT DOCUMENTS

2010/0308678 A1* 12/2010 Liang ...................... B60L 50/61
                                                          310/156.38
2016/0079814 A1*  3/2016 Lacroix ................... H02K 9/06
                                                          310/156.53
(Continued)

FOREIGN PATENT DOCUMENTS

JP       2001-178045 A    6/2001
JP       2007-97290 A     4/2007
(Continued)

OTHER PUBLICATIONS

Machine Translation of WO_2019064801_A1 (Year: 2019).*
(Continued)

*Primary Examiner* — Thomas Truong
*Assistant Examiner* — Charlie Frank Mann, Jr.
(74) *Attorney, Agent, or Firm* — XSENSUS LLP

(57) ABSTRACT

A rotor includes a rotor core fixed to a shaft, a pair of magnet slots arranged in a V-shape in the rotor core so as to be separated away from each other toward a radially outer side, permanent magnets inserted into the magnet slots, and a hole provided on the radially outer side of the magnet slots. The distance between each permanent magnet and the hole increases toward the radially outer side. The distance between an outer circumference of the rotor core and the hole is not less than the distance between each magnet slot and the outer circumference of the rotor core.

20 Claims, 12 Drawing Sheets

(58) Field of Classification Search
USPC .................................................. 310/156.01
See application file for complete search history.

(56) References Cited

U.S. PATENT DOCUMENTS

| | | | |
|---|---|---|---|
| 2016/0329845 A1* | 11/2016 | Jannot | H02P 6/182 |
| 2017/0057373 A1* | 3/2017 | Hao | H02K 3/28 |
| 2018/0269735 A1* | 9/2018 | Kaneshige | H02K 1/28 |

FOREIGN PATENT DOCUMENTS

| | | | | |
|---|---|---|---|---|
| JP | 2014-87075 A | 5/2014 | | |
| JP | 2015-173545 A | 10/2015 | | |
| JP | 2018-157669 A | 10/2018 | | |
| WO | WO-2019064801 A1 * | 4/2019 | | H02K 1/276 |

OTHER PUBLICATIONS

International Search Report and Written Opinion mailed on Mar. 23, 2021, received for PCT Application PCT/JP2021/002729, filed on Jan. 27, 2021, 8 pages including English Translation.

* cited by examiner

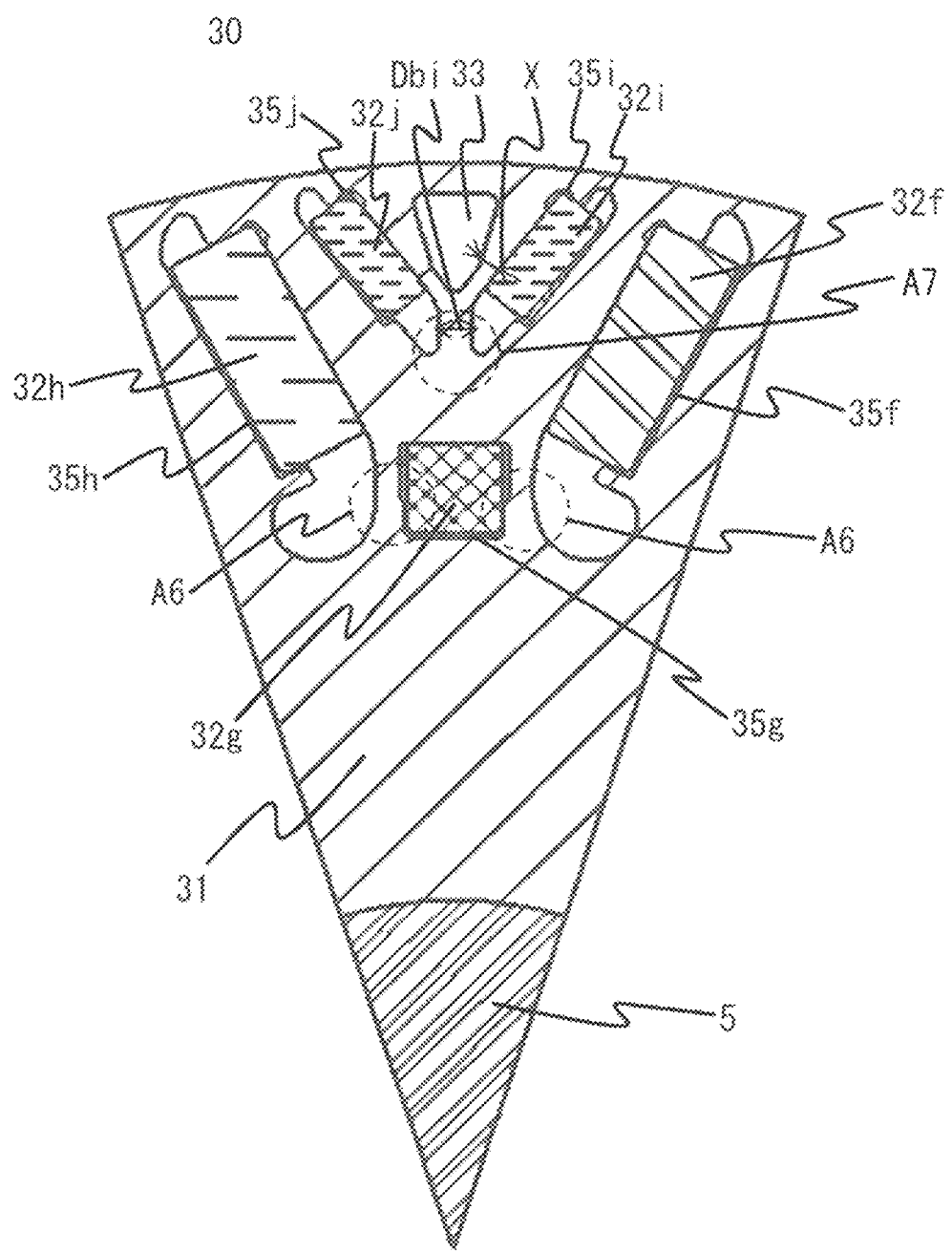

ROTATING ELECTRIC MACHINE

CROSS-REFERENCE TO RELATED APPLICATIONS

The present application is based on PCT filing PCT/JP2021/002729, filed Jan. 27, 2021, which claims priority to JP 2020-068813, filed Apr. 7, 2020, the entire contents of each are incorporated herein by reference.

TECHNICAL FIELD

The present disclosure relates to a rotating electric machine.

BACKGROUND ART

As a rotor structure of a permanent-magnet synchronous rotating electric machine, a structure in which magnets are deeply embedded in a rotor iron core so as to obtain large torque is well known. In such a structure, in order to retain iron core parts located on the outer circumferential side and the inner circumferential side of the magnets against a centrifugal force applied to the iron core, it is necessary to provide bridge-shaped structures in the iron core parts on the outer circumferential side and the inner circumferential side of the magnets. The bridge-shaped structures are generally formed by iron core parts integrated with the iron core parts on the outer circumferential side and the inner circumferential side of the magnets, and serve as leakage magnetic paths through which magnetic fluxes of the magnets are short-circuited in the rotor. As the rotation speed increases, stress due to the centrifugal force applied to each bridge portion increases, and therefore it is necessary to thicken the bridge portion. Along with this, the leakage magnetic paths increase, so that it becomes impossible to effectively use the magnetic flux for generation of torque and it becomes difficult to achieve both of large torque and high-speed rotation.

On the other hand, there is a structure in which a rotor is retained in the axial direction by bolts without forming bridge portions, so as to achieve both of large torque and high-speed rotation (see Patent Document 1). Meanwhile, in a permanent-magnet synchronous rotating electric machine with magnets arranged in a V shape, there is a structure in which a hole is provided at an iron core part surrounded by the magnets arranged in the V shape, thereby a centrifugal force is reduced and both of large torque and high-speed rotation is achieved (see Patent Document 2).

CITATION LIST

Patent Document

Patent Document 1: Japanese Laid-Open Patent Publication No. 2001-178045
Patent Document 2: Japanese Laid-Open Patent Publication No. 2015-173545

SUMMARY OF THE INVENTION

Problems to be Solved by the Invention

In the structure having no bridge portions as shown in Patent Document 1, there is a problem that it is difficult to assemble the rotor and thus it becomes difficult to ensure concentricity and outer-circumference roundness of the rotor. In the permanent-magnet synchronous rotating electric machine with magnets arranged in a V shape as shown in Patent Document 2, magnets are arranged on the outer circumferential side of the rotor iron core. Thus, there is a problem that the weight on the outer circumferential side cannot be reduced and it is difficult to obtain an effect of reducing stress due to a centrifugal force and an effect of reducing a leakage magnetic flux.

The present disclosure has been made to solve the above problems, and an object of the present disclosure is to provide a rotating electric machine that can prevent breakage due to a centrifugal force and can reduce a leakage magnetic flux.

Means for Solving the Problems

A rotating electric machine according to the present disclosure has a rotor provided on an inner circumferential side of a stator. The rotor includes a rotor core fixed to a shaft, a pair of magnet slots arranged in a V-shape in the rotor core so as to be separated away from each other toward a radially outer side, permanent magnets inserted into the magnet slots, and a hole provided on a radially outer side of the magnet slots. A distance between each permanent magnet and the hole increases toward a radially outward side. A distance between an outer circumference of the rotor core and the hole is not less than a distance between each magnet slot and the outer circumference of the rotor core.

Effect of the Invention

In the rotating electric machine according to the present disclosure, it is possible to prevent breakage due to a centrifugal force and reduce leakage magnetic flux.

BRIEF DESCRIPTION OF THE DRAWINGS

FIG. 12 is a sectional plane view of a part of a rotor in embodiment 8.

EMBODIMENTS FOR CARRYING OUT THE INVENTION

Embodiment 1

The present embodiment relates to a rotor structure of an embedded-magnet-type permanent-magnet synchronous rotating electric machine.

Figure 1:
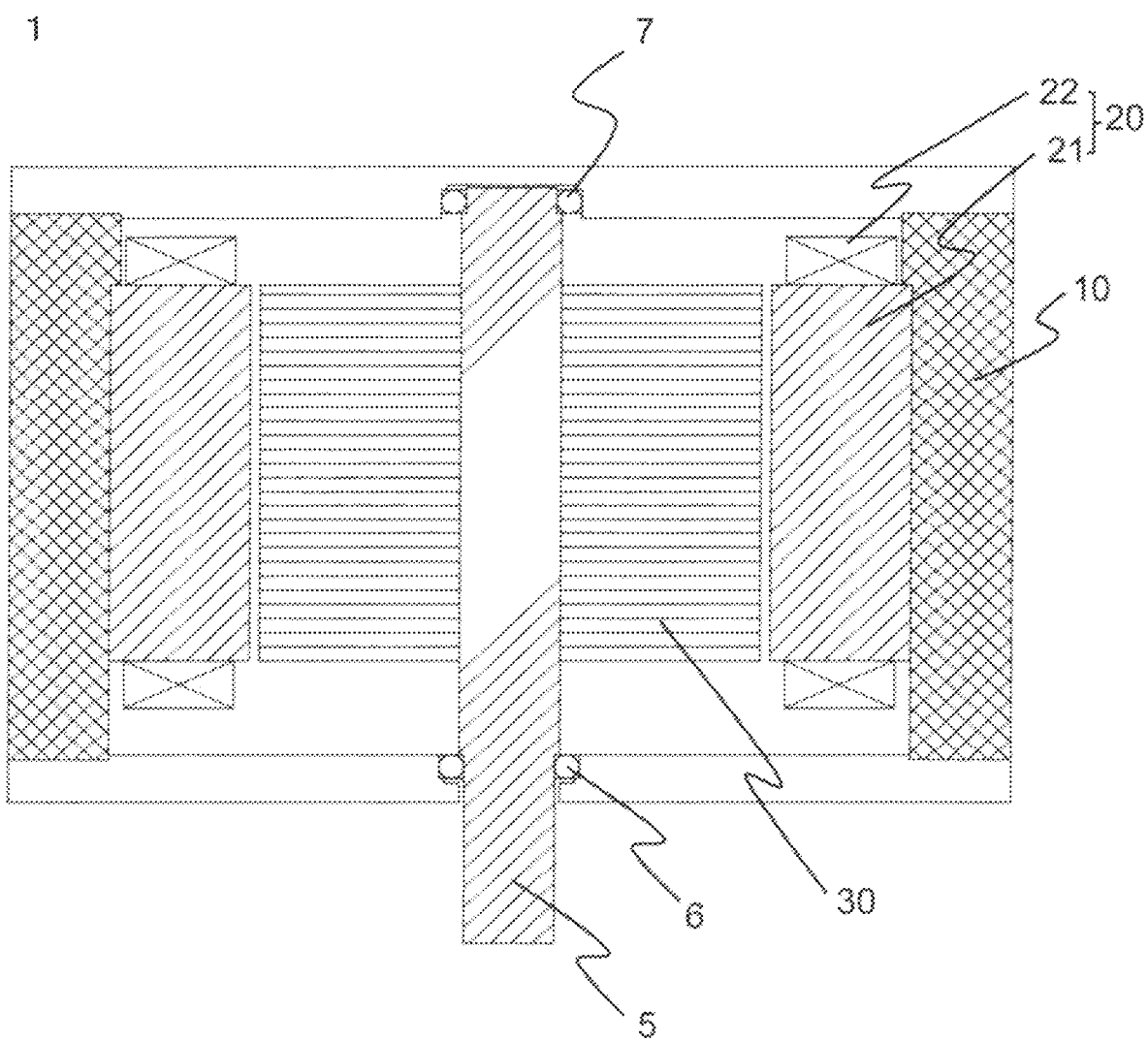
FIG. 1 is a sectional side view taken along a rotation axis of a motor which is a rotating electric machine.
Figure 2:
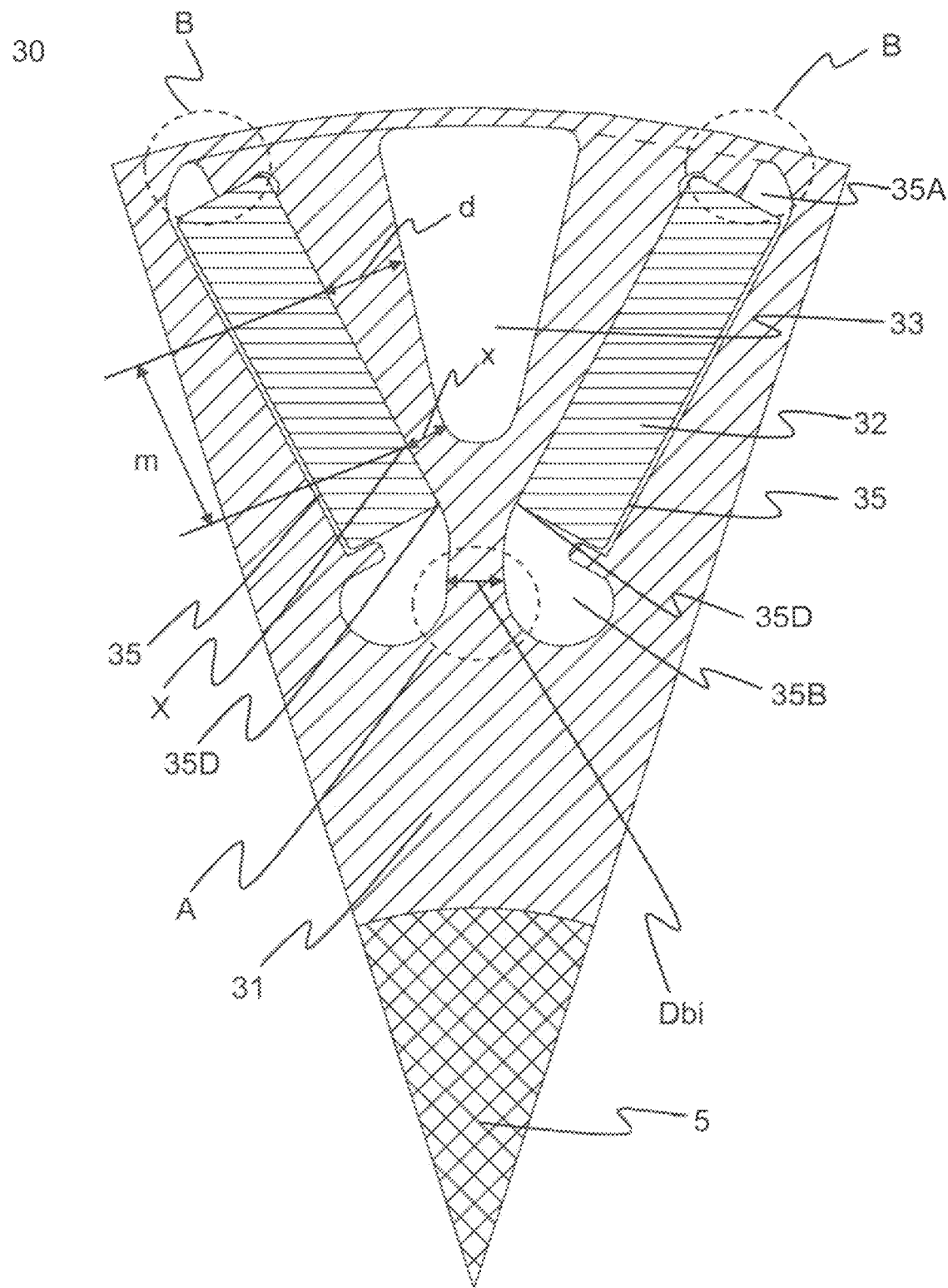
FIG. 2 is a sectional plane view of a part of a rotor in embodiment 1.

Hereinafter, an inner circumferential side and an outer circumferential side refer to an inner circumferential side and an outer circumferential side of a rotor. FIG. 1 is a sectional side view taken along a rotation axis of a motor which is the rotating electric machine. FIG. 2 is a sectional plane view of a part of the rotor in embodiment 1, and is a sectional view along a direction perpendicular to the rotation axis. The rotor is formed so that a multiple number of the same structures as the partial rotor shown in FIG. 2 are arranged in the circumferential direction.

As shown in FIG. 1, a motor 1 comprises a stator 20 and a rotor 30 stored in a frame 10. In the rotor 30, both ends in the axial direction of a shaft 5 are rotatably supported by a load-side bearing 6 and a anti-load-side bearing 7. The stator 20 comprises a stator core 21 having tooth portions protruding in the radial direction toward the rotor 30 from an annular yoke portion, and coils 22 wound around the tooth portions.

As shown in FIG. 2, the rotor 30 includes a rotor core 31 fixed to the shaft 5 by press-fit or the like, and a pair of magnet slots 35 arranged in a V-shaped and a band-shape in the rotor core 31. That is, the pair of magnet slots 35 are arranged so as to be separated away from each other toward the radially outer side and have an interval (Dbi described later) therebetween on the radially inner side.

The rotor 30 further includes permanent magnets 32 inserted in the magnet slots 35 and a hole 33 provided on the radially outer side of the pair of magnet slots 35. As the hole 33 is provided, the weight of the entire rotor 30 is reduced and thus stress due to a centrifugal force at each bridge portion described later can be relaxed, whereby increase in the rotation speed of the rotating electric machine can be facilitated.

The rotor core 31 is formed by stacking thin steel sheets in the axial direction. Each magnet slot 35 is provided with a void 35A for reducing the influence of a harmonic magnetic flux flowing in and out through the outer circumferential surface of the rotor core 31. Each magnet slot 35 is provided with a flux barrier portion 35B for preventing occurrence of a leakage magnetic flux. The pair of magnet slots 35 arranged in a V-shaped and a band-shape are divided as two parts in the rotor core 31, and a part A of the rotor core 31 that splits the pair of magnet slots 35 is referred to as a center bridge portion. Meanwhile, a part B between each magnet slot 35 and the outermost circumferential part of the rotor 30 is referred to as an outer circumferential bridge portion. The width of the smallest part of the center bridge portion A in the rotor core 31 that splits the magnet slots 35 is Dbi.

The permanent magnets 32 are respectively inserted in the pair of two divided magnet slots 35. The distance between the magnet slot 35 and the hole 33 has a minimum value x at a point X along a side line toward the radially outer side of the permanent magnet 32 from a corner 35D of the permanent magnet 32 that is closest to the center bridge portion A. Then, x=Dbi/2 is satisfied. That is, stress due to a centrifugal force acting on the width Dbi of the smallest part of the center bridge portion A has to be supported between the magnet slots 35 and the hole 33, and since points X are present at two parts on the left and right sides, x has to be at least Dbi/2.

In the case in which a residual magnetic flux density of the permanent magnet 32 (a magnetic flux density of magnetism from the permanent magnet) is defined as Br, a magnetic flux saturation density of the rotor core 31 (iron) is defined as 2T (TESLA), and the axial-direction length of the rotor 30 is defined as L, the maximum magnetic flux that can pass at the center bridge portion A is calculated by the following Expression (1).

$$2(T) \times Dbi \times L \tag{1}$$

Meanwhile, at the points X, a magnetic flux (leakage magnetic flux) that is lost when passing through the center bridge portion A from the permanent magnets 32 is calculated by the following Expression (2).

$$x \times Br \times L \times 2 \text{ (there are two points } X\text{)} \tag{2}$$

Since Expression (1)=Expression (2) is satisfied, x=Dbi/Br is satisfied.

The distance between the permanent magnet 32 and the hole 33 gradually expands toward the radially outer side from the minimum distance x at the point X, and a distance d between the hole 33 and the permanent magnet 32 at a point at a distance m from the point X along a side line toward the radially outer side of the permanent magnet 32 is represented as d=Br×m/2.

That is, the amount of a magnetic flux that goes out toward the outer circumferential side of the rotor core 31 from a range of the permanent magnet 32 from the point X to the point at the distance m is calculated by the following Expression (3).

$$Br \times m \times L \tag{3}$$

In the case in which the magnetic flux saturation density of iron is defined as 2T, the maximum amount of a magnetic flux that can pass at the point at the distance m from the point X is calculated by the following Expression (4).

$$d \times L \times 2(T) \tag{4}$$

Therefore, Expression (4)≥Expression (3) has to be satisfied, so that d≥Br×m/2 is obtained.

It is noted that, in the case in which the magnetic flux saturation density of metal forming the rotor core 31 is defined as BS, d≥Br×m/BS has to be satisfied.

The distance between the outer circumference of the rotor core 31 and the hole 33 is equal to the distance (distance at the outer circumferential bridge portion B) between the outer circumference of the rotor core 31 and each of the two divided magnet slots 35. That is, in the outer circumferential bridge portion B, the distance between each magnet slot 35 and the outer circumference of the rotor core 31 is ensured so that the rotor core 31 will not be broken, and therefore it is enough that the distance between the outer circumference of the rotor core 31 and the hole 33 is designed to be equal to the distance between each magnet slot 35 and the outer circumference of the rotor core 31.

As described above, along the side line toward the radially outer side of the permanent magnet 32 from the corner 35D of the permanent magnet 32 that is closest to the center bridge portion A, the distance between the permanent magnet 32 and the hole 33 is minimum at the point X and gradually expands toward the radially outer side from the point X. Then, at the point at the distance m from the point X along the side line toward the radially outer side of the permanent magnet 32, the distance d between the hole 33 and the permanent magnet 32 is represented as d=Br×m/2. Thus, the hole 33 can be provided without hampering the magnetic flux produced from the permanent magnets 32. When the hole 33 is provided as described above, the weight of the rotor core 31 on the outer circumferential side of the permanent magnets 32 can be reduced, so that a centrifugal force can be reduced. Further, since the strength is sufficiently ensured, the width of the center bridge portion A and the width of the outer circumferential bridge portions B can be reduced, whereby a leakage magnetic flux can be reduced.

At the point X along the side line toward the radially outer side of the permanent magnet 32 from the corner 35D of the permanent magnet 32 that is closest to the center bridge portion A, the distance between the permanent magnet 32 and the hole 33 is minimum and the minimum distance is Dbi/2. Thus, stress due to a centrifugal force generated in the rotor core 31 between the permanent magnet 32 and the hole 33 is equal to stress due to a centrifugal force generated in the center bridge portion A, so that breakage of the rotor core 31 due to stress can be prevented.

The distance between the outer circumference of the rotor core 31 and the hole 33 is equal to the distance between the outer circumference of the rotor core 31 and each of the two divided magnet slots 35. Thus, stress due to a centrifugal force generated on the outer circumferential side of the hole 33 in the rotor core 31 is equal to stress due to a centrifugal force generated at the outer circumferential bridge portion B in the rotor core 31. And at the outer circumferential bridge portion B, the distance between the magnet slot 35 and the outermost circumference of the rotor core 31 is ensured so that the rotor core 31 will not be broken. Thus, breakage of the rotor core 31 due to a centrifugal force can be prevented.

The distance between the outer circumference of the rotor core 31 and the hole 33 may be set to be not less than the distance between the outer circumference of the rotor core 31 and each of the two divided magnet slots 35, in order to increase the strength.

In the present embodiment, the residual magnetic flux density of the permanent magnet 32 is defined as Br, the distance between the magnet slot 35 and the hole 33 is minimum at the point X along the side line toward the radially outer side of the permanent magnet 32 from the corner 35D of the permanent magnet 32 that is closest to the center bridge portion A, and the minimum distance is Dbi/2. Then, the distance between the permanent magnet 32 and the hole 33 gradually expands toward the radially outer side from the minimum distance at the point X. At the point at the distance m from the point X along the side line toward the radially outer side of the permanent magnet 32, the distance d between the hole 33 and the permanent magnet 32 is set as d=Br×m/2 (d=Br×m/BS). It is noted that the same effects are provided as long as the distance between the permanent magnet 32 and the hole 33 at the point X is not less than Dbi/2. Therefore, d=Dbi/2 is satisfied. Further, also regarding the distance d between the hole 33 and the permanent magnet 32 at the point at the distance m from the point X along the side line toward the radially outer side of the permanent magnet 32, the same effects are provided as long as the distance d is not less than Br×m/BS.

Embodiment 2

Figure 3:
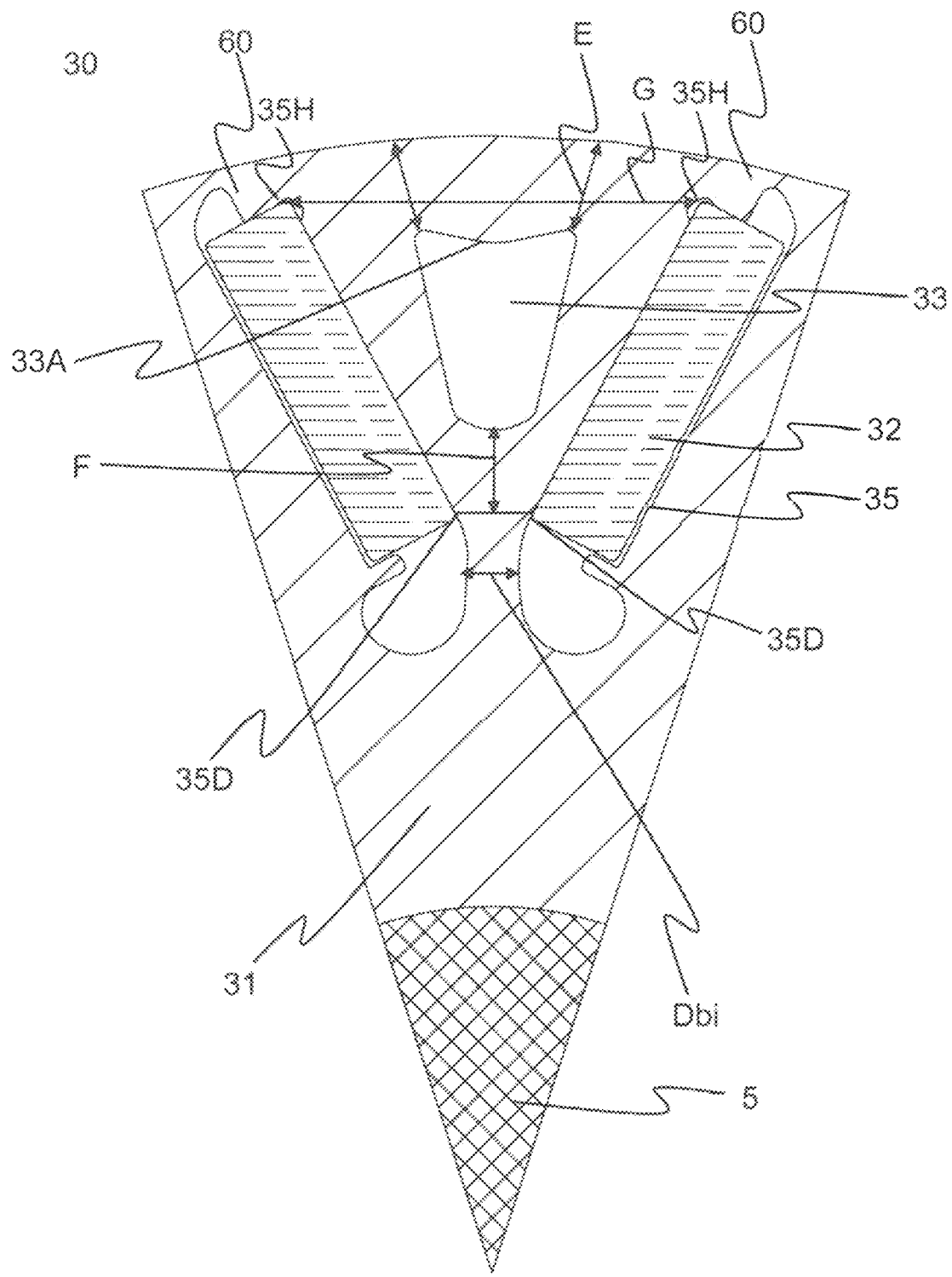
FIG. 3 is a sectional plane view of a part of a rotor in embodiment 2.
Figure 4:
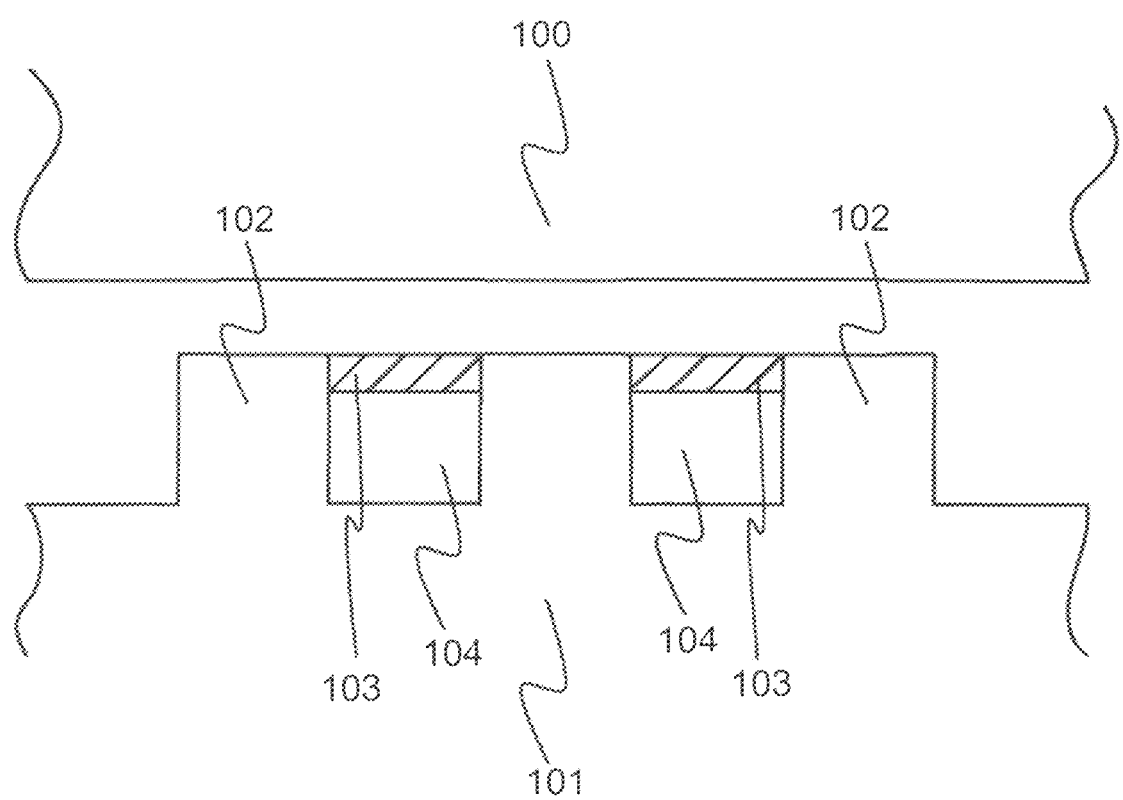
FIG. 4 illustrates a principle of a general reluctance motor.

FIG. 3 is a sectional plane view of a part of a rotor in embodiment 2. In the present embodiment, in the case in which a rotating electric machine is used as a reluctance motor, a configuration is made so that a magnetic flux entering the rotor core 31 and serving to generate reluctance torque is not hampered by the hole 33, thereby large torque can be obtained. FIG. 4 illustrates a principle of a general reluctance motor. In order to simplify description, a stator and a rotor are drawn in linear shapes, but they are actually formed into round shapes. In FIG. 4, a magnetic flux based on a rotating magnetic field from a stator 100 flows into a rotor 101, whereby a magnetic force is generated at protrusions 102 formed on the rotor 101, and the rotor 101 is rotated. At this time, it is known that the rotating electric machine operates as a reluctance motor even if there are plate-shaped objects 103 at upper positions between the protrusions 102. In FIG. 3, parts denoted by 60 correspond to the protrusions 102, and the hole 33 corresponds to a recess 104.

In the present embodiment, the sum (E+F) of the shortest distance E between the outermost circumference of the rotor core 31 and the hole 33, and the shortest distance F between the hole 33 and the line connecting the corners 35D of the permanent magnets 32 that are near to the center bridge portion A, is ½ of the distance G between corners 35H of the permanent magnets 32 that are located on the outermost circumferential side. That is, in FIG. 3, a relational expression 2×(E+F)=G is satisfied.

Figure 5:
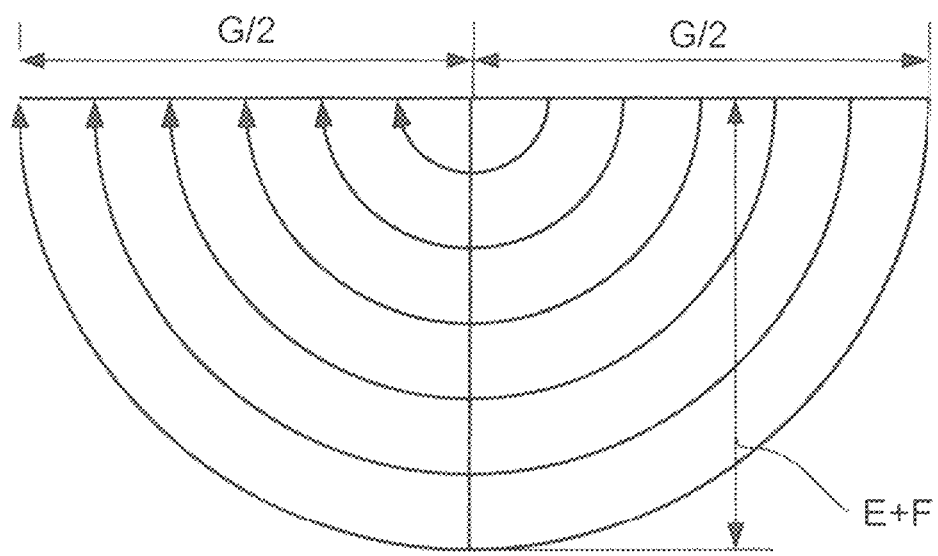
FIG. 5 schematically shows the state of magnetic flux passing through a rotor core.

In this configuration, a magnetic flux serving to generate reluctance torque and entering the rotor core 31 on the outer circumferential side of the pair of permanent magnets 32 arranged in a V-shaped and a band-shape is not hampered by the hole 33, and therefore large reluctance torque can be obtained. That is, as shown in FIG. 5, since the configuration is designed so as to satisfy (E+F)=G/2, a magnetic flux entering in a G/2 range from the stator all passes through the rotor core 31 part, so that large reluctance torque can be obtained. Further, as shown in FIG. 3, an arc shape 33A having a convex shape toward the inner circumferential side is provided on the outer circumferential side of the hole 33, whereby a larger amount of magnetic flux from the stator can pass there.

In the present embodiment, the sum (E+F) of the shortest distance E between the outer circumference of the rotor core 31 and the hole 33, and the shortest distance F between the hole 33 and the line connecting the corners 35D of the permanent magnets 32 that are near to the center bridge portion A, is ½ of the distance G between the corners 35H of the permanent magnets 32 that are located on the outermost circumferential side. However, as (E+F) increases, a larger amount of magnetic flux is likely to pass, and therefore the same effects are obtained as long as (E+F) is designed to be not less than ½ of the distance G.

Figure 6:
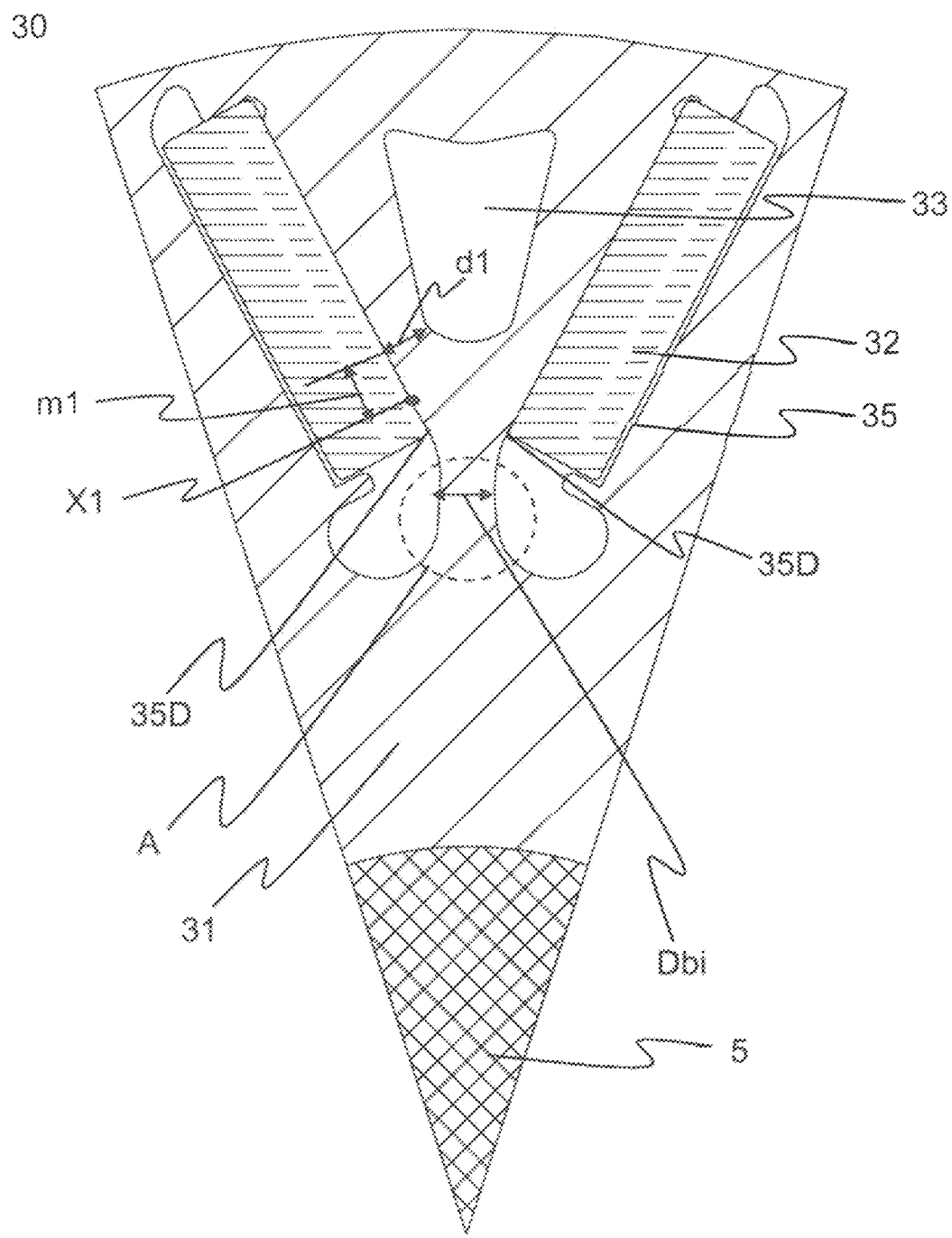
FIG. 6 is a sectional plane view of a part of a rotor in embodiment 2.

FIG. 6 is similar to FIG. 3 and is a sectional plane view of a part of a rotor in embodiment 2. In the same manner as embodiment 1, the permanent magnets 32 are respectively inserted in the two divided magnet slots 35. In the case in which the residual magnetic flux density of the permanent magnet 32 is defined as Br, the distance between the magnet slot 35 and the hole 33 is minimum at a point at a distance m1 radially outward from a point X1 at a distance of Dbi/Br along a side line toward the radially outer side of the permanent magnet 32 from the corner 35D of the permanent magnet 32 that is closest to the center bridge portion A. The distance between the magnet slot 35 and the hole 33 at the point at the distance m1 is set to be larger than Dbi/2 and larger than Br×m½, in the same manner as embodiment 1. From the minimum value at the point at the distance m1, the distance between the permanent magnet 32 and the hole 33 gradually expands toward the radially outer side, and gradually expands toward the radially inner side. The distance d1 between the hole 33 and the permanent magnet 32 at the point at the distance m1 from the point X1 along the side line toward the radially outer side of the permanent magnet 32 is larger than the larger one of Br×m/2 and Dbi/2. The other configurations are the same as those in embodiment 1. Also in this configuration, in the same manner as embodiment 1, a leakage magnetic flux can be reduced and breakage of the rotor core 31 due to a centrifugal force can be prevented.

Embodiment 3

Figure 7:
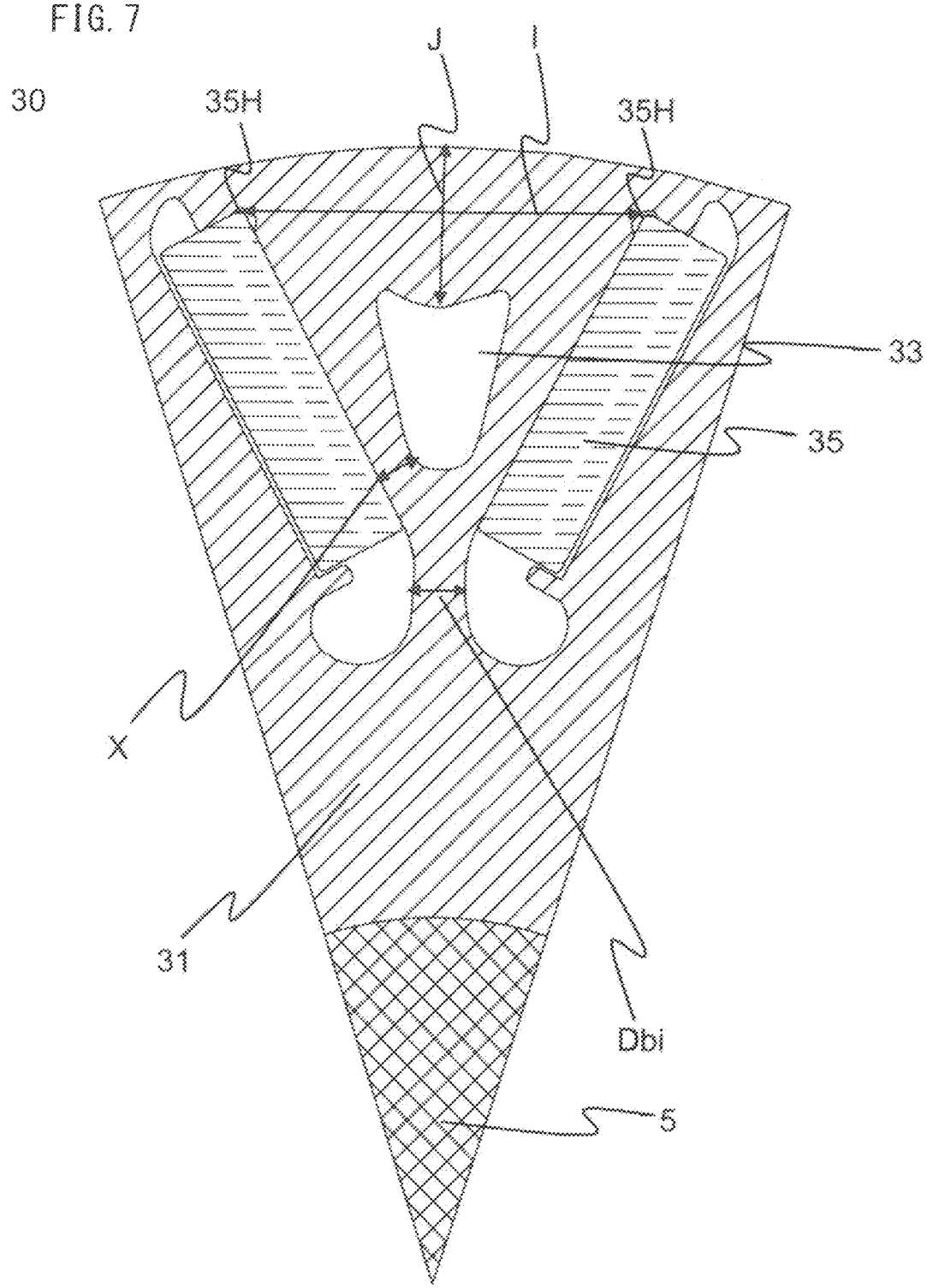
FIG. 7 is a sectional plane view of a part of a rotor in embodiment 3.

FIG. 7 is a sectional plane view of a part of a rotor in embodiment 3. In the present embodiment, in the same manner as embodiment 2, when a rotating electric machine is used as a reluctance motor, a configuration is made so that a magnetic flux entering into the rotor core 31 and serving to generate reluctance torque is not hampered by the hole 33, thereby large torque can be obtained.

As shown in FIG. 7, the distance J between the outer circumference of the rotor core 31 and the hole 33 is set to be ½ of the distance I between the corners 35H of the permanent magnets 32 that are located on the outermost circumferential side. The other configurations are the same as those in embodiment 2.

Since the distance J between the outer circumference of the rotor core 31 and the hole 33 is ½ of the distance I between the corners 35H of the permanent magnets 32 that are located on the outermost circumferential side, in the same manner as embodiment 2, a magnetic flux serving to generate reluctance torque and entering into the rotor core 31 on the outer circumferential side of the permanent magnets 32 arranged in a V-shaped and a band-shape is not hampered by the hole 33, so that large torque can be obtained.

In embodiment 3, the distance J between the outer circumference of the rotor core 31 and the hole 33 is ½ of the distance I between the corners 35H of the permanent magnets 32 that are located on the outermost circumferential side. However, as the distance J increases, a larger amount of magnetic flux can pass, and therefore the same effects are obtained as long as the distance J is not less than ½ of the distance I.

Embodiment 4

Figure 8:
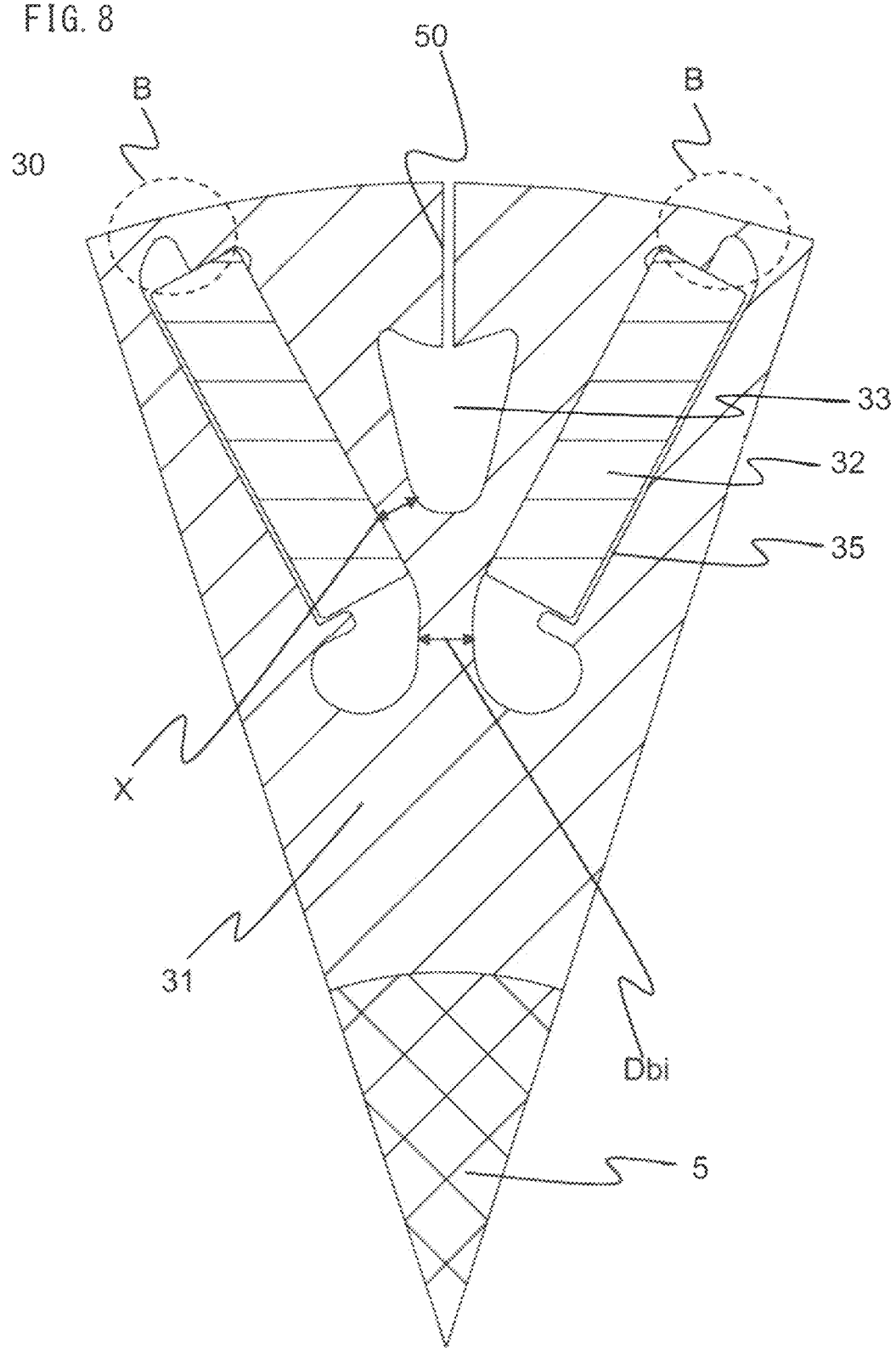
FIG. 8 is a sectional plane view of a part of a rotor in embodiment 4.

FIG. 8 is a sectional plane view of a part of a rotor in embodiment 4.

As shown in FIG. 8, a slit portion 50 is provided between the circumferential-direction center of the hole 33 and the outer circumference of the rotor core 31 so as to penetrate toward the radially outer side. In order to prevent decrease in a magnetic flux for generating reluctance torque, the width of the slit portion 50 is set to be less than the distance between the hole 33 and the outer circumference of the rotor core 31. The other configurations are the same as those in embodiment 3.

Also in this configuration, in the same manner as embodiment 3, a magnetic flux entering into the rotor core 31 and serving to generate reluctance torque is not hampered by the hole 33, so that large torque can be obtained.

In addition, the slit portion 50 splits hoop stress (tensile stress acting in the tangent direction of the circumference) due to a centrifugal force generated near the outer circumference of the rotor core 31. Thus, a centrifugal force generated at each outer circumferential bridge portion B can be reduced, and therefore the width of the outer circumferential bridge portion B can be reduced, whereby a leakage magnetic flux can be reduced. In addition, since the slit portion 50 is present at a center part between the pair of permanent magnets 32, stress due to a centrifugal force is not biased and the leakage magnetic flux can be reduced in a well-balanced manner.

Embodiment 5

Figure 9:
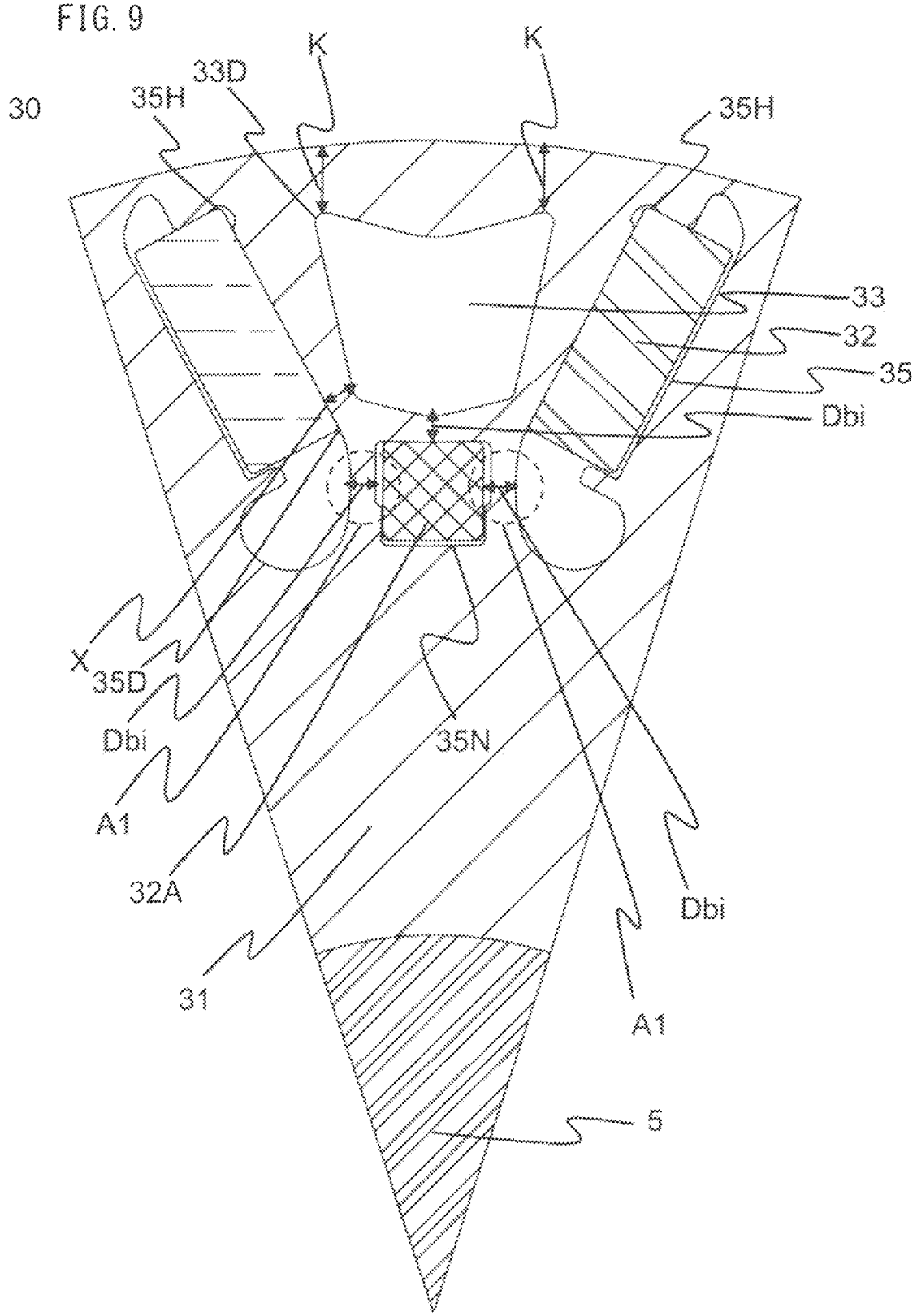
FIG. 9 is a sectional plane view of a part of a rotor in embodiment 5.

FIG. 9 is a sectional plane view of a part of a rotor in embodiment 5.

As shown in FIG. 9, the rotor 30 includes the rotor core 31 fixed to the shaft 5 by press-fit or the like, three magnet slots 35 arranged in a bathtub shape and a band-shape in the rotor core 31, permanent magnets 32 inserted in the magnet slots 35, and the hole 33 provided on the radially outer side of the magnet slots 35. The magnet slots 35 are divided into three parts in the rotor core 31, and two parts of the rotor core 31 that split the magnet slots 35 are referred to as center bridge portions A1. The width of the smallest part of each of the two center bridge portions A1 in the rotor core 31 that split the magnet slots 35 is Dbi. In the present embodiment, there are two smallest parts having the width Dbi, unlike embodiment 1.

The permanent magnets 32 are respectively inserted in the three divided magnet slots 35. In the same manner as embodiment 1, in the case in which the residual magnetic flux density of the permanent magnet 32 is denoted by Br, the distance between the hole 33 and each of the magnet slots 35 on both sides arranged in a V shape is minimum at the point X at a distance of Dbi/Br along the side line toward the radially outer side of the permanent magnet 32 from the corner 35D of the permanent magnet 32 that is nearest to the center bridge portion A1 on the corresponding side, and the minimum distance is Dbi. In the present embodiment, since there are two center bridge portions A1 having the width Dbi unlike embodiment 1, the minimum distance is not Dbi/2 but Dbi. In the same manner as embodiment 1, the distance between the hole 33 and the permanent magnet 32 on each of both sides gradually expands toward the radially outer side from the minimum distance at the point X, and the distance d between the hole 33 and the permanent magnet 32 at the point at the distance m from the point X along the side line toward the radially outer side of the permanent magnet 32 is represented as d=Br×m/2. The principle of the above structure is the same as that described in embodiment 1.

Further, in the same manner as embodiment 3, the distance between the outer circumference of the rotor core 31 and the hole 33 is set to be ½ of the distance between the corners 35H of the both-side permanent magnets 32 that are located on the outermost circumferential side. A center magnet slot 35N is provided on the inner circumferential side of the hole 33, between the magnet slots 35 on both sides arranged in a V-shape. A center permanent magnet 32A is inserted in the center magnet slot 35N. The distance between the hole 33 and the center magnet slot 35N in which the center permanent magnet 32A is inserted is minimum at the center of the center permanent magnet 32A, and the minimum distance is Dbi.

The shortest distance K between the outer circumference of the rotor core 31 and the hole 33 is equal to the distance between the outer circumference of the rotor core 31 and the outermost-circumferential-side corner of the permanent magnet 32 on each of both sides. The shortest-distance position is a position away from the center of the hole 33 in the circumferential direction, and the distance between the outer circumference of the rotor core 31 and the hole 33 gradually expands toward the center. Thus, reluctance torque can be increased.

As described above, at the point X along the side line toward the radially outer side of the permanent magnet 32 from the corner 35D of the permanent magnet 32 that is nearest to the center bridge portion A1 on each of both sides, the distance between the hole 33 and the permanent magnet 32 on the corresponding side is minimum, and the distance gradually expands toward the radially outer side. The distance d between the hole 33 and the permanent magnet 32 at the point at the distance m from the point X along the side line toward the radially outer side of the permanent magnet 32 is set to satisfy d=Br×m/2. Thus, in the same manner as embodiment 1, the hole 33 can be provided without hampering the magnetic flux generated from the permanent magnets 32. Further, the core weight of the rotor core 31 on the outer circumferential side of the permanent magnets 32 is reduced, whereby a centrifugal force can be reduced. Further, since the width of the center bridge portion A1 and the width of the outer circumferential bridge portion can be reduced, a leakage magnetic flux can be reduced.

At the point X along the side line toward the radially outer side of the permanent magnet 32 from the corner 35D of the permanent magnet 32 that is nearest to the center bridge portion A1, the distance between the permanent magnet 32 and the hole 33 is minimum, and the minimum distance is Dbi. Therefore, stress due to a centrifugal force generated in the rotor core 31 between the permanent magnet 32 and the hole 33 is equal to stress due to a centrifugal force generated in the center bridge portion A1, so that breakage of the rotor core 31 due to a centrifugal force can be prevented.

Further, the shortest distance K between the outer circumference of the rotor core 31 and the hole 33 is equal to the distance between the outer circumference of the rotor core 31 and the outermost-circumferential-side corner 35H of the permanent magnet 32 on each of both sides, the shortest-distance position is a position away from the center of the hole 33 in the circumferential direction, and the distance between the outer circumference of the rotor core 31 and the hole 33 gradually increases toward the center.

Thus, stress due to a centrifugal force generated on the outer circumferential side of the hole 33 in the rotor core 31 is equal to stress generated at the outer circumferential bridge portion of the rotor core 31, so that breakage of the rotor core 31 due to a centrifugal force can be prevented. In addition, since an outermost-circumferential-side position 33D of the hole 33 is located on the inner circumferential side relative to the outermost-circumferential-side corner 35H of the permanent magnet 32, the outer-circumferential-side opening width of a magnetic path between the permanent magnet 32 and the hole 33 can be designed to become large, whereby a large amount of magnetic flux for generating reluctance torque can be introduced and torque can be increased. Further, the shortest distance K between the outer circumference of the rotor core 31 and the hole 33 is located at a position away from the center of the hole 33 in the circumferential direction, and the distance between the outer circumference of the rotor core 31 and the hole 33 gradually increases toward the center. Thus, a large amount of magnetic flux for generating reluctance torque can be introduced in the rotor core 31 between the outer circumference of the rotor core 31 and the hole 33, whereby reluctance torque can be increased and large torque can be obtained.

Also in the present embodiment, in the same manner as embodiment 1, the same effects are obtained as long as the distance between the permanent magnet 32 and the hole 33 at the point X is not less than Dbi. In addition, the same effects are obtained as long as the distance d between the hole 33 and the permanent magnet 32 at the point at the distance m from the point X along the side line toward the radially outer side of the permanent magnet 32 is not less than Br×m/2 (Br×m/BS). Further, the slit portion 50 described in embodiment 4 may be provided in the configuration shown in FIG. 9.

Embodiment 6

Figure 10:
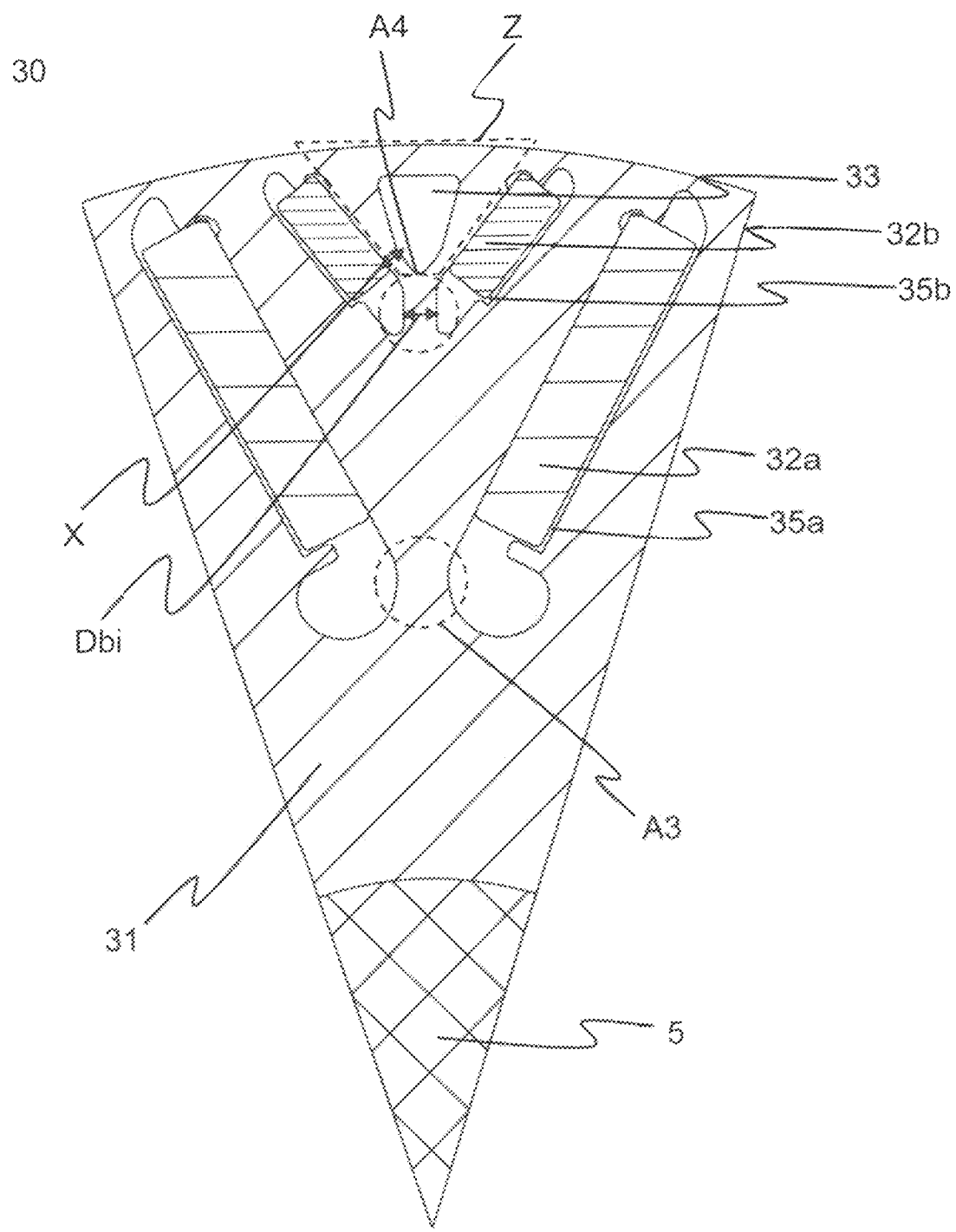
FIG. 10 is a sectional plane view of a part of a rotor in embodiment 6.

FIG. 10 is a sectional plane view of a part of a rotor in embodiment 6.

As shown in FIG. 10, the rotor 30 includes the rotor core 31 fixed to the shaft 5 by press-fit or the like. The rotor core 31 has outer-circumferential-side magnet slots and inner-circumferential-side magnet slots arranged in a V-shape and a band-shape so as to form two layers on the outer circumferential side and the inner circumferential side. That is, the rotor core 31 has inner-circumferential-side magnet slots 35a (first inner-circumferential-side magnet slots), inner-circumferential-side permanent magnets 32a (first inner-circumferential-side permanent magnets) inserted in the inner-circumferential-side magnet slots 35a, outer-circumferential-side magnet slots 35b, and outer-circumferential-side permanent magnets 32b inserted in the outer-circumferential-side magnet slots 35b. Further, the rotor core 31 has the hole 33 provided on the radially outer side of the outer-circumferential-side magnet slots 35b arranged in a V-shape and a band-shape.

When the magnets are provided in a multilayer form as described above, reluctance torque is more readily generated, whereby torque can be increased. When the magnets are provided in two layers instead of one layer, a new magnetic path is formed between the first layer and the second layer. This magnetic path corresponds to a q-axis magnetic path in a dq coordinate system, and a q-axis magnetic flux passes through this magnetic path, so that the q-axis inductance increases. Since reluctance torque is generated due to saliencies of the d-axis inductance and the q-axis inductance, the reluctance torque increases when the q-axis inductance increases. Thus, forming the multilayer structure facilitates increase in torque.

Meanwhile, in the case in which the magnets are provided in a multilayer form, the amount of an iron core in the rotor through which a magnetic flux passes is reduced, so that magnetic saturation readily occurs. In particular, an iron core (part enclosed by a dotted line Z in FIG. 10) present between the outer circumference of the rotor 30 and the outer-circumferential-side permanent magnets 32b shown in FIG. 10 is reduced, and therefore magnetic saturation more readily occurs than in the case of not forming the two-layer structure. However, as described in the present embodiment, since the hole 33 is formed, the above part is also prevented from being magnetically saturated, and the above part can be reduced in weight. Thus, the width of the bridge portion can be reduced and a leakage magnetic flux can be reduced, so that torque can be increased.

The rotor core 31 is formed by stacking thin steel sheets in the axial direction. The inner-circumferential-side magnet slots 35a and the outer-circumferential-side magnet slots 35b arranged in a V-shape and a band-shape are respectively divided into two parts in the rotor core 31, and parts of rotor core 31 that split the inner-circumferential-side magnet slots 35a and the outer-circumferential-side magnet slots 35b are respectively referred to as an inner-circumferential-side center bridge portion A3 and an outer-circumferential-side center bridge portion A4. The width of the smallest part of the outer-circumferential-side center bridge portion A4 in the rotor core 31 that splits the outer-circumferential-side magnet slot 35b is Dbi. The inner-circumferential-side permanent magnets 32a and the outer-circumferential-side permanent magnets 32b are respectively inserted in the two divided inner-circumferential-side magnet slots 35a and the two divided outer-circumferential-side magnet slots 35b.

In the case in which the residual magnetic flux density of the outer-circumferential-side permanent magnet 32b is defined as Br, in the same manner as embodiment 1, the distance between the outer-circumferential-side magnet slot 35b and the hole 33 is minimum at the point X along the side line toward the radially outer side of the outer-circumferential-side permanent magnet 32b from the corner of the outer-circumferential-side permanent magnet 32b that is nearest to the outer-circumferential-side center bridge portion A4, and the minimum distance is Dbi/2. The distance between the outer-circumferential-side permanent magnet 32b and the hole 33 gradually expands toward the radially outer side from the minimum distance at the point X, and the distance d between the hole 33 and the outer-circumferential-side permanent magnet 32b at the point at the distance m from the point X along the side line toward the radially outer side of the outer-circumferential-side permanent magnet 32b is represented as d=Br×m/2.

In addition, in the same manner as embodiment 3, the distance between the outer circumference of the rotor core 31 and the hole 33 is ½ of the distance between the outermost-circumferential-side corners of the outer-circumferential-side permanent magnets 32b.

As described above, at the point X along the side line toward the radially outer side of the outer-circumferential-side permanent magnet 32b from the corner of the outer-circumferential-side permanent magnet 32b that is nearest to the outer-circumferential-side center bridge portion A4, the distance between the outer-circumferential-side permanent magnet 32b and the hole 33 is minimum, and the distance gradually expands toward the radially outer side. The distance d between the hole 33 and the outer-circumferential-side permanent magnet 32b at the point at the distance m from the point X along the side line toward the radially outer side of the outer-circumferential-side permanent magnet 32b is set to satisfy d=Br×m/2. Thus, in the same manner as embodiment 1, the hole 33 can be provided without hampering the magnetic flux generated from the outer-circumferential-side permanent magnets 32b. Further, the core weight of the rotor core 31 on the outer circumferential side of the outer-circumferential-side permanent magnets 32b can be reduced, whereby a centrifugal force can be reduced. Further, the width of the center bridge portion and the width of the outer circumferential bridge portion can be reduced and a leakage magnetic flux can be reduced.

In the same manner as embodiment 1, at the point X along the side line toward the radially outer side of the outer-circumferential-side permanent magnet 32b from the corner of the outer-circumferential-side permanent magnet 32b that is nearest to the outer-circumferential-side center bridge portion A4, the distance between the outer-circumferential-side permanent magnet 32b and the hole 33 is minimum, and the minimum distance is Dbi/2. Therefore, stress due to a centrifugal force generated in the rotor core 31 between the outer-circumferential-side permanent magnet 32b and the hole 33 is equal to stress generated in the outer-circumferential-side center bridge portion A4, so that breakage of the rotor core 31 due to a centrifugal force can be prevented.

In addition, in the same manner as embodiment 3, the distance between the outer circumference of the rotor core 31 and the hole 33 is larger than ½ of the distance between the outermost-circumferential-side corners of the outer-circumferential-side permanent magnets 32b. Therefore, a magnetic flux relevant to reluctance torque generated on the radially outer side of the outer-circumferential-side magnet slots 35b arranged in a V-shape and a band-shape in the rotor core 31 is not hampered, so that torque can be increased.

In embodiment 6, in the case in which the residual magnetic flux density of the outer-circumferential-side permanent magnet 32b is defined as Br, the distance between the outer-circumferential-side magnet slot 35b and the hole 33 is minimum at the point X at a distance of Dbi/Br along the side line toward the radially outer side of the outer-circumferential-side permanent magnet 32b from the corner of the outer-circumferential-side permanent magnet 32b that is nearest to the outer-circumferential-side center bridge portion A4, and the minimum distance is Dbi/2. Then, the distance between the outer-circumferential-side permanent magnet 32b and the hole 33 gradually expands toward the radially outer side from the minimum distance at the point X, and the distance d between the hole 33 and the outer-circumferential-side permanent magnet 32b at the point at the distance m from the point X along the side line toward the radially outer side of the outer-circumferential-side permanent magnet 32b is set as d=Br×m/2. It is noted that, regarding the distance d between the outer-circumferential-side permanent magnet 32b and the hole 33 at the point X, breakage of the rotor core 31 due to a centrifugal force can be prevented as long as the distance d is not less than Dbi/2.

In addition, the hole 33 can be provided without hampering a magnetic flux generated from the permanent magnet 32, as long as the distance d between the hole 33 and the outer-circumferential-side permanent magnet 32b at the point at the distance m from the point X along the side line toward the radially outer side of the outer-circumferential-side permanent magnet 32b is not less than Br×m/2.

In the above description, it is described that the outer-circumferential-side permanent magnet 32b is inserted into the outer-circumferential-side magnet slot 35b. However, only the outer-circumferential-side magnet slot 35b may be provided without inserting the outer-circumferential-side permanent magnet 32b.

In this case, it can be considered that Br of the outer-circumferential-side permanent magnet 32b is zero, and at the point X, the distance between the outer-circumferential-side magnet slot 35b and the hole 33 becomes infinity. However, the distance between the outer-circumferential-side permanent magnet 32b and the hole 33 satisfies conditions that the distance is not less than Dbi/2 and is Br×m/2, at all the points. As a result, it is enough that the distance between the outer-circumferential-side magnet slot 35b and the hole 33 is not less than Dbi/2.

It is noted that the inner-circumferential-side magnet slots 35a and the inner-circumferential-side permanent magnets 32a inserted in the inner-circumferential-side magnet slots 35a may be configured in any manner.

Embodiment 7

Figure 11:
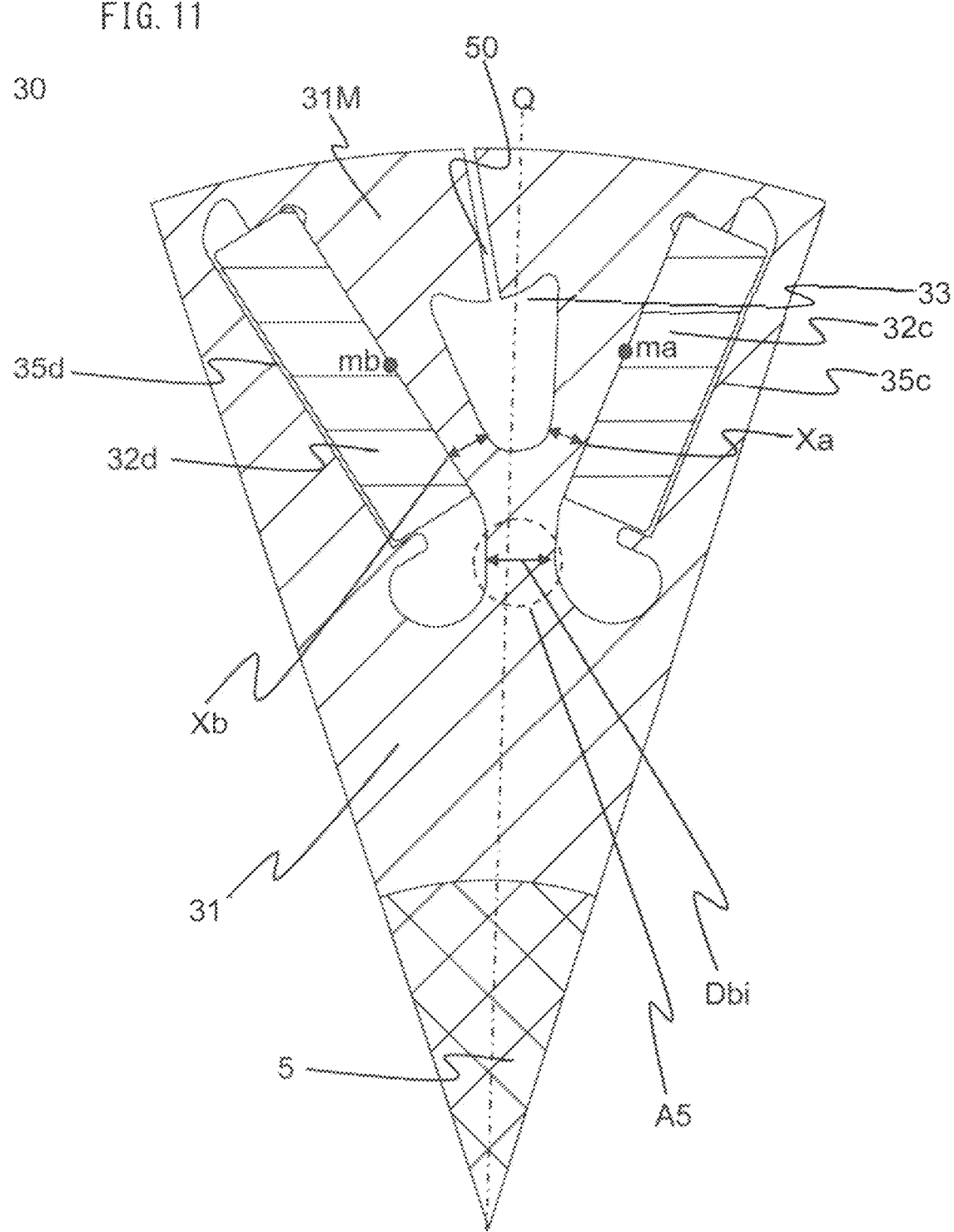
FIG. 11 is a sectional plane view of a part of a rotor in embodiment 7.

FIG. 11 is a sectional plane view of a part of a rotor in embodiment 7.

As shown in FIG. 11, the rotor 30 includes the rotor core 31 fixed to the shaft 5 by press-fit or the like, and a magnet slot 35c and a magnet slot 35d which are arranged in a V-shape and a band-shape and which are formed asymmetrically in the circumferential direction in the rotor core 31. Further, the rotor 30 includes a permanent magnet 32c and a permanent magnet 32d respectively inserted in the magnet slot 35c and the magnet slot 35d, and the hole 33 provided on the radially outer side of the magnet slot 35c and the magnet slot 35d.

The rotor core 31 is formed by stacking thin steel sheets in the axial direction. A part of the rotor core 31 that splits the magnet slot 35c and the magnet slot 35d is referred to as a center bridge portion A5. The width of the smallest part of the center bridge portion A5 is Dbi. The permanent magnet 32c and the permanent magnet 32d are different in the dimension in the long-side direction. Thus, when rotation is performed in one direction (counterclockwise direction in FIG. 11), torque can be increased. That is, in FIG. 11, the area of a 31M part of the rotor core 31 is reduced and therefore a magnetic flux becomes more likely to concentrate on this part, thus an advantage in rotation in the counterclockwise direction is brought. In the case in which the residual magnetic flux density of the permanent magnet 32c and the permanent magnet 32d is defined as Br, the distance between the magnet slot 35c and the hole 33, and the distance between the magnet slot 35d and the hole 33, are set in the same manner as in embodiment 1. That is, the distance between the magnet slot 35c and the hole 33 is minimum at a point Xa at a distance of Dbi/Br along the side line toward the radially outer side of the permanent magnet 32c from the corner of the permanent magnet 32c that is nearest to the center bridge portion A5, and the minimum distance is Dbi/2. In addition, the distance between the magnet slot 35d and the hole 33 is minimum at a point Xb at a distance of Dbi/Br along the side line toward the radially outer side of the permanent magnet 32d from the corner of the permanent magnet 32d that is nearest to the center bridge portion A5, and the minimum distance is Dbi/2.

The distance between the permanent magnet 32c and the hole 33 gradually expands toward the radially outer side from the minimum distance at the point Xa, and a distance da between the hole 33 and the permanent magnet 32c at a point at a distance ma from the point Xa along the side line toward the radially outer side of the permanent magnet 32c is represented as da=Br×m/2. In addition, the distance between the permanent magnet 32d and the hole 33 gradually expands toward the radially outer side from the minimum distance at the point Xb, and a distance db between the hole 33 and the permanent magnet 32d at a point at a distance mb from the point Xb along the side line toward the radially outer side of the permanent magnet 32d is represented as db=Br×m/2.

In addition, in the same manner as embodiment 3, the distance between the outer circumference of the rotor core 31 and the hole 33 is ½ of the distance between the corners of the permanent magnets 32c and 32d that are located on the outermost circumferential side. Thus, a magnetic flux relevant to reluctance torque is not hampered, so that torque can be increased.

Further, the slit portion 50 is provided between the circumferential-direction center of the hole 33 and the outer circumference of the rotor core 31 so as to penetrate toward the radially outer side. The width of the slit portion 50 is smaller than the distance between the hole 33 and the outer circumference of the rotor core 31.

In FIG. 11, the permanent magnet 32c and the permanent magnet 32d are different in the dimension in the long-side direction and are the same in the other matters. However, they may be different in not only the dimension in the long-side direction but also the dimension in the short-side direction or the residual magnetic flux density Br.

Alternatively, the inclinations of the magnet slot 35c and the magnet slot 35d may be set asymmetrically with respect to a center line Q in the radial direction while the permanent magnet 32c and the permanent magnet 32d are the same in the dimension in the long-side direction, the dimension in the short-side direction, and the residual magnetic flux density Br. Conversely, one or all of the dimension in the long-side direction, the dimension in the short-side direction, and the residual magnetic flux density Br may be different while the inclinations of the magnet slot 35c and the magnet slot 35d are set symmetrically with respect to the center line Q in the radial direction. Alternatively, the slit portion 50 may be inclined so as to have an angle with respect to the center line Q in the radial direction while the inclinations of the magnet slot 35c and the magnet slot 35d are symmetric with respect to the center line Q in the radial direction and the permanent magnet 32c and the permanent magnet 32d are the same in the dimension in the long-side direction, the dimension in the short-side direction, and the residual magnetic flux density Br. Also in such configurations, when rotation is performed in one direction, torque can be increased. In addition, since the slit portion 50 is inclined so as to have an angle with respect to the center line Q in the radial direction and is inclined in the counterclockwise direction, a magnetic flux readily concentrates on the rotation-direction advancing side when rotation is performed in the counterclockwise direction, and torque in this direction can be increased. Further, the hole 33 may be formed asymmetrically with respect to the center line Q in the radial direction.

Embodiment 8

FIG. 12 is a sectional plane view of a part of a rotor in embodiment 8.

As shown in FIG. 12, the rotor 30 includes the rotor core 31 fixed to the shaft 5 by press-fit or the like. The rotor core 31 includes three inner-circumferential-side magnet slots 35f, 35g, 35h (second inner-circumferential-side magnet slots) arranged in a bathtub shape and a band-shape on the inner circumferential side, inner-circumferential-side permanent magnets 32f, 32g, 32h (second inner-circumferential-side permanent magnets) inserted in the inner-circumferential-side magnet slots 35f, 35g, 35h, outer-circumferential-side magnet slots 35i, 35j arranged in a V-shape and a band-shape on the outer circumferential side, and outer-circumferential-side permanent magnets 32i, 32j inserted in the outer-circumferential-side magnet slots 35i, 35j. Here, as shown in FIG. 12, the bathtub shape refers to a shape in which the inner-circumferential-side magnet slots 35f, 35h are arranged in a V-shape and the inner-circumferential-side magnet slot 35g is further provided at the center of the V-shape so that the three inner-circumferential-side magnet slots are arranged in a U-shape.

In FIG. 12, the three inner-circumferential-side magnet slots 35f, 35g, 35h are arranged in a U-shape on the inner circumferential side, but the bathtub shape is not limited to a shape using three magnet slots. Three or more magnet slots may be arranged in a U-shape. Further, the rotor core 31 includes the hole 33 on the radially outer side of the outer-circumferential-side magnet slots 35i, 35j arranged in a V-shape and a band-shape.

When the three inner-circumferential-side magnet slots 35f, 35g, 35h are arranged in a U-shape on the inner circumferential side as described above, the same effects as in embodiment 6 are provided. Further, since the permanent magnets are divided into three parts in a bathtub shape (U-shape) instead of a V-shape, an unnecessary iron core through which a q-axis magnetic flux passes between the first layer and the second layer can be reduced, whereby the width of the bridge portion can be reduced. When the width of the bridge portion can be reduced, a leakage magnetic flux can also be reduced, so that torque can be increased.

The rotor core 31 is formed by stacking thin steel sheets in the axial direction. The inner-circumferential-side magnet slots 35f, 35g, 35h arranged in a bathtub shape and a band-shape are divided into three parts in the rotor core 31, and the outer-circumferential-side magnet slots 35i, 35j arranged in a V-shape and a band-shape are divided into two parts in the rotor core 31. Parts of the rotor core 31 that split the inner-circumferential-side magnet slots 35f, 35g, 35h and the outer-circumferential-side magnet slots 35i, 35j are respectively referred to as inner-circumferential-side center bridge portions A6 and an outer-circumferential-side center bridge portion A7. The width of the smallest part of the outer-circumferential-side center bridge portion A7 in the rotor core 31 that splits the outer-circumferential-side magnet slots 35i, 35j is Dbi. The inner-circumferential-side permanent magnets 32f, 32g, 32h are respectively inserted in the three divided inner-circumferential-side magnet slots 35f, 35g, 35h, and the outer-circumferential-side permanent magnets 32i, 32j are respectively inserted in the two divided outer-circumferential-side magnet slots 35i, 35j.

In the case in which the residual magnetic flux density of the outer-circumferential-side permanent magnet 32i is defined as Br, in the same manner as embodiment 1, the distance between the outer-circumferential-side magnet slot 35i and the hole 33 is minimum at the point X along the side line toward the radially outer side of the outer-circumferential-side permanent magnet 32i from the corner of the outer-circumferential-side permanent magnet 32i that is nearest to the outer-circumferential-side center bridge portion A7, and the minimum distance is Dbi/2. The distance between the outer-circumferential-side permanent magnet 32i and the hole 33 gradually expands toward the radially outer side from the minimum distance at the point X, and the distance d between the hole 33 and the outer-circumferential-side permanent magnet 32i at the point at the distance m from the point X along the side line toward the radially outer side of the outer-circumferential-side permanent magnet 32i is represented as d=Br×m/2.

In addition, in the same manner as embodiment 3, the distance between the outer circumference of the rotor core 31 and the hole 33 is ½ of the distance between the outermost-circumferential-side corners of the outer-circumferential-side permanent magnets 32i, 32j.

As described above, at the point X along the side line toward the radially outer side of the outer-circumferential-side permanent magnet 32i from the corner of the outer-circumferential-side permanent magnet 32i that is nearest to the outer-circumferential-side center bridge portion A7, the distance between the outer-circumferential-side permanent magnet 32i and the hole 33 is minimum, and the distance gradually expands toward the radially outer side. The distance d between the hole 33 and the outer-circumferential-side permanent magnet 32i at the point at the distance m from the point X along the side line toward the radially outer side of the outer-circumferential-side permanent magnet 32i is set to satisfy d=Br×m/2. Thus, in the same manner as embodiment 1, the hole 33 can be provided without hampering the magnetic flux generated from the outer-circumferential-side permanent magnet 32i. Further, the core weight of the rotor core 31 on the outer circumferential side of the outer-circumferential-side permanent magnet 32i can be reduced, whereby a centrifugal force can be reduced. Further, the widths of the center bridge portions and the outer circumferential bridge portions can be reduced and a leakage magnetic flux can be reduced.

In the same manner as embodiment 1, at the point X along the side line toward the radially outer side of the outer-circumferential-side permanent magnet 32i from the corner of the outer-circumferential-side permanent magnet 32i that is nearest to the outer-circumferential-side center bridge portion A7, the distance between the outer-circumferential-side permanent magnet 32i and the hole 33 is minimum, and the minimum distance is Dbi/2. Thus, stress due to a centrifugal force generated in the rotor core 31 between the outer-circumferential-side permanent magnet 32i and the hole 33 is equal to stress generated in the outer-circumferential-side center bridge portion A7, so that breakage of the rotor core 31 due to a centrifugal force can be prevented.

In addition, in the same manner as embodiment 3, the distance between the outer circumference of the rotor core 31 and the hole 33 is larger than ½ of the distance between the outermost-circumferential-side corners of the outer-circumferential-side permanent magnets 32i. Therefore, a magnetic flux relevant to reluctance torque generated on the radially outer side of the outer-circumferential-side magnet slots 35i arranged in a V-shape and a band-shape in the rotor core 31 is not hampered, so that torque can be increased.

In embodiment 8, in the case in which the residual magnetic flux density of the outer-circumferential-side permanent magnet 32i is defined as Br, the distance between the outer-circumferential-side magnet slot 35i and the hole 33 is minimum at the point X at a distance of Dbi/Br along the side line toward the radially outer side of the outer-circumferential-side permanent magnet 32i from the corner of the outer-circumferential-side permanent magnet 32i that is nearest to the outer-circumferential-side center bridge portion A7, and the minimum distance is Dbi/2. Then, the distance between the outer-circumferential-side permanent magnet 32i and the hole 33 gradually expands toward the radially outer side from the minimum distance at the point X, and the distance d between the hole 33 and the outer-circumferential-side permanent magnet 32i at the point at the distance m from the point X along the side line toward the radially outer side of the outer-circumferential-side permanent magnet 32i is set as d=Br×m/2. It is noted that, regarding the distance between the outer-circumferential-side permanent magnet 32i and the hole 33 at the point X, breakage of the rotor core 31 due to a centrifugal force can be prevented as long as the distance is not less than Dbi/2. That is, if d≥Dbi/2 is satisfied, breakage of the rotor core 31 due to a centrifugal force can be prevented.

In addition, the hole 33 can be provided without hampering a magnetic flux generated from the permanent magnet 32, as long as the distance d between the hole 33 and the outer-circumferential-side permanent magnet 32i at the point at the distance m from the point X along the side line toward the radially outer side of the outer-circumferential-side permanent magnet 32i is not less than Br×m/2.

In the above description, it is described that the outer-circumferential-side permanent magnet 32i is inserted into the outer-circumferential-side magnet slot 35i. However, only the outer-circumferential-side magnet slot 35i may be provided without inserting the outer-circumferential-side permanent magnet 32i. In this case, it can be considered that Br of the outer-circumferential-side permanent magnet 32i is zero, and at the point X, the distance between the outer-circumferential-side magnet slot 35i and the hole 33 becomes infinity. However, the distance between the outer-circumferential-side permanent magnet 32i and the hole 33 satisfies conditions that the distance is not less than Dbi/2 and is Br×m/2, at all the points. As a result, it is enough that the distance between the outer-circumferential-side magnet slot 35i and the hole 33 is not less than Dbi/2.

It is noted that the inner-circumferential-side magnet slots 35f, 35g, 35h and the inner-circumferential-side permanent magnets 32f, 32g, 32h inserted in the inner-circumferential-side magnet slots 35f, 35g, 35h may be configured in any manner.

In the above embodiments 1 to 8, it is described that the permanent magnet 32 has a rectangular cross section. However, a corner thereof may be formed into a rounded shape (arc shape) or formed into a chamfered shape (cut in an isosceles right triangle shape). In this case, the corner mentioned in the above description may be regarded as a virtual corner in the case in which the permanent magnet 32 is supposed to have a rectangular cross section.

In the above embodiments 1 to 8, it is described that one hole 33 is provided. However, a plurality of divided holes may be provided. In this case, all the holes are arranged at positions within the hole 33 in the above embodiments 1 to 8 in which one hole is provided.

In the above embodiments 1 to 8, the case in which the distance between the permanent magnet and the hole monotonically increases toward the radially outer side, has been described. However, the permanent magnet and the hole may be partially parallel to each other or the hole 33 may have recesses and projections so that the distance non-monotonically increases.

In the above embodiments 4, 7, the case in which the slit portion 50 penetrates so as to reach the hole 33 has been shown. However, the slit portion 50 may be split by a part of the rotor core 31.

In the above embodiments 1 to 8, the winding method for the stator coil may be distributed winding or concentrated winding.

Although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 5 shaft
20 stator
30 rotor
31 rotor core
32 permanent magnet
35 magnet slot
33 hole
50 slit portion

The invention claimed is:

1. A rotating electric machine having a rotor provided on an inner circumferential side of a stator, wherein
the rotor includes a rotor core fixed to a shaft, a pair of magnet slots arranged in a V-shape in the rotor core so as to be separated away from each other toward a radially outer side, permanent magnets inserted into the magnet slots, and a hole provided on a radially outer side of the magnet slots,
a distance between each permanent magnet and the hole increases toward a radially outward side, and
a distance between an outer circumference of the rotor core and the hole is not less than a distance between each magnet slot and the outer circumference of the rotor core,
in the case in which a width of a smallest part of a center bridge portion in the rotor that splits the magnet slots is defined as Dbi, a residual magnetic flux density of each permanent magnet is defined as Br, a magnetic flux saturation density of metal forming the rotor core is defined as BS, a point at which a distance between each magnet slot and the hole has a minimum value along a side line toward a radially outer side of the permanent magnet from a corner of the permanent magnet that is nearest to the center bridge portion is defined as a point X, and a distance between the hole and the permanent magnet at a point at a distance m from the point X along the side line toward the radially outer side of the permanent magnet is defined as d, relational expressions d≥Br×m/BS and d≥Dbi/2 are satisfied.

2. The rotating electric machine according to claim 1, wherein
on an inner circumferential side of the pair of magnet slots arranged in the V-shape, a pair of first inner-circumferential-side magnet slots arranged in a V-shape so as to be separated away from each other toward a radially outer side are provided, and
first inner-circumferential-side permanent magnets are inserted into the first inner-circumferential-side magnet slots.

3. The rotating electric machine according to claim 1, wherein
on an inner circumferential side of the pair of magnet slots arranged in the V-shape, three or more second inner-circumferential-side magnet slots arranged in a U-shape are provided, and
second inner-circumferential-side permanent magnets are inserted into the second inner-circumferential-side magnet slots.

4. The rotating electric machine according to claim 1, wherein a sum of a shortest distance between the outer circumference of the rotor core and the hole, and a shortest distance between the hole and a line connecting corners of the permanent magnets that are near to the center bridge portion, is not less than ½ of a distance between corners of the permanent magnets that are located on an outermost circumferential side.

5. The rotating electric machine according to claim 1, wherein a distance between the outer circumference of the rotor core and the hole is not less than ½ of a distance between corners of the permanent magnets that are located on an outermost circumferential side.

6. The rotating electric machine according to claim 1, wherein
a slit portion is provided between the hole and the outer circumference of the rotor core so as to penetrate toward a radially outer side, and
a width of the slit portion is less than a distance between the hole and the outer circumference of the rotor core.

7. The rotating electric machine according to claim 6, wherein
the slit portion is inclined so as to have an angle with respect to a center line in a radial direction.

8. The rotating electric machine according to claim 6, wherein a distance between the outer circumference of the rotor core and the hole is not less than ½ of a distance between corners of the permanent magnets that are located on an outermost circumferential side.

9. The rotating electric machine according to claim 1, wherein inclinations of the pair of magnet slots are asymmetric with respect to a center line in a radial direction.

10. The rotating electric machine according to claim 9, wherein a distance between the outer circumference of the rotor core and the hole is not less than ½ of a distance between corners of the permanent magnets that are located on an outermost circumferential side.

11. The rotating electric machine according to claim 1, wherein the hole is formed asymmetrically with respect to a center line in the radial direction.

12. A rotating electric machine having a rotor provided on an inner circumferential side of a stator, wherein the rotor includes a rotor core fixed to a shaft, a pair of magnet slots arranged in a V-shape in the rotor core so as to be separated away from each other toward a radially outer side, permanent magnets inserted into the magnet slots, and a hole provided on a radially outer side of the magnet slots, a distance between each permanent magnet and the hole increases toward a radially outward side, and a distance between an outer circumference of the rotor core and the hole is not less than a distance between each magnet slot and the outer circumference of the rotor core, a center magnet slot is provided on an inner circumferential side of the hole, between the pair of magnet slots arranged in the V-shape, and a center permanent magnet is inserted into the center magnet slot, in the case in which a width of a smallest part of each center bridge portions in the rotor that split the pair of magnet slots and the center magnet slot is defined as Dbi, a residual magnetic flux density of each permanent magnet is defined as Br, a magnetic flux saturation density of metal forming the rotor core is defined as BS, a point at which a distance between each magnet slot and the hole has a minimum value along a side line toward a radially outer side of the permanent magnet from a corner of the permanent magnet that is nearest to the center bridge portion is defined as a point X, and a distance between the hole and the permanent magnet at a point at a distance m from the point X along the side line toward the radially outer side of the permanent magnet is defined as d, relational expressions d≥Br×m/BS and d≥Dbi are satisfied.

13. The rotating electric machine according to claim 12, wherein a sum of a shortest distance between the outer circumference of the rotor core and the hole, and a shortest distance between the hole and a line connecting corners of the permanent magnets that are near to the center bridge portion, is not less than ½ of a distance between corners of the permanent magnets that are located on an outermost circumferential side.

14. The rotating electric machine according to claim 12, wherein a distance between the outer circumference of the rotor core and the hole is not less than ½ of a distance between corners of the permanent magnets that are located on an outermost circumferential side.

15. The rotating electric machine according to claim 12, wherein a slit portion is provided between the hole and the outer circumference of the rotor core so as to penetrate toward a radially outer side, and a width of the slit portion is less than a distance between the hole and the outer circumference of the rotor core.

16. The rotating electric machine according to claim 15, wherein the slit portion is inclined so as to have an angle with respect to a center line in a radial direction.

17. The rotating electric machine according to claim 15, wherein a distance between the outer circumference of the rotor core and the hole is not less than ½ of a distance between corners of the permanent magnets that are located on an outermost circumferential side.

18. The rotating electric machine according to claim 12, wherein inclinations of the pair of magnet slots are asymmetric with respect to a center line in a radial direction.

19. The rotating electric machine according to claim 18, wherein a distance between the outer circumference of the rotor core and the hole is not less than ½ of a distance between corners of the permanent magnets that are located on an outermost circumferential side.

20. The rotating electric machine according to claim 12, wherein the hole is formed asymmetrically with respect to a center line in the radial direction.

\* \* \* \* \*